(12) United States Patent
Kolatschek

(10) Patent No.: US 10,737,651 B2
(45) Date of Patent: Aug. 11, 2020

(54) METHOD OF DETERMINING AN ACCIDENT TIME PARAMETER FOR EVALUATING AN ACCIDENT SITUATION IN A MOTOR VEHICLE

(71) Applicant: Robert Bosch GmbH, Stuttgart (DE)

(72) Inventor: Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 15/880,113

(22) Filed: Jan. 25, 2018

(65) Prior Publication Data

US 2018/0215334 A1  Aug. 2, 2018

(30) Foreign Application Priority Data

Feb. 2, 2017  (DE) .................. 10 2017 201 655

(51) Int. Cl.
| | | |
|---|---|---|
| *B60R 21/0132* | (2006.01) | |
| *B60R 21/16* | (2006.01) | |
| *B60R 22/195* | (2006.01) | |
| *B60R 21/01* | (2006.01) | |

(52) U.S. Cl.
CPC .......... *B60R 21/0133* (2014.12); *B60R 21/16* (2013.01); *B60R 22/195* (2013.01); *B60R 2021/01013* (2013.01); *B60R 2021/01034* (2013.01); *B60R 2021/01211* (2013.01); *B60R 2021/01272* (2013.01)

(58) Field of Classification Search
CPC ... B60R 21/0133; B60R 22/195; B60R 21/16; B60R 2021/01272; B60R 2021/01211; B60R 2021/01034; B60R 2021/01013; B60R 16/0232; B60W 2555/00; B60W 2050/002; B60W 50/00
USPC .......................................................... 701/45
See application file for complete search history.

(56) References Cited

U.S. PATENT DOCUMENTS

| | | | | |
|---|---|---|---|---|
| 2003/0097212 | A1* | 5/2003 | Feser .................. | B60R 21/0132 701/45 |
| 2003/0105569 | A1* | 6/2003 | Roelleke ............. | B60R 21/0132 701/45 |
| 2008/0204209 | A1* | 8/2008 | Theisen .................. | G01P 15/00 340/436 |
| 2008/0243342 | A1* | 10/2008 | Breed ................. | B60R 21/0132 701/45 |
| 2010/0077847 | A1* | 4/2010 | Joe ........................ | G01M 17/02 73/146 |

FOREIGN PATENT DOCUMENTS

| | | |
|---|---|---|
| DE | 3803426 A1 | 8/1989 |
| DE | 10134331 C1 | 10/2002 |
| DE | 102006031241 A1 | 1/2008 |

(Continued)

*Primary Examiner* — Jonathan M Dager
*Assistant Examiner* — Jean W Charleston
(74) *Attorney, Agent, or Firm* — Norton Rose Fulbright US LLP; Gerard Messina

(57) ABSTRACT

A method of determining an accident time parameter for evaluating an accident situation of a motor vehicle, including a) determining at least two of the following values: (i) a current value of a measured acceleration, (ii) a first integral of the measured acceleration, or (iii) a second integral of the measured acceleration, and b) determining an accident time parameter from the at least two values determined in step a).

18 Claims, 2 Drawing Sheets

(56) References Cited

FOREIGN PATENT DOCUMENTS

| DE | 102009000568 | A1 | * | 8/2010 | ......... B60R 21/0136 |
| DE | 102009000568 | A1 | | 8/2010 | |
| DE | 102009045757 | A1 | | 4/2011 | |
| DE | 102013211354 | A1 | | 12/2014 | |

* cited by examiner

METHOD OF DETERMINING AN ACCIDENT TIME PARAMETER FOR EVALUATING AN ACCIDENT SITUATION IN A MOTOR VEHICLE

CROSS REFERENCE

The present application claims the benefit under 35 U.S.C. § 119 of German Patent Application No. DE 102017201655.8 filed on Feb. 2, 2017, which is expressly incorporated herein by reference in its entirety.

BACKGROUND INFORMATION

The present invention relates to a method of determining an accident time parameter for evaluating an accident situation in a motor vehicle, the method being used, in particular, for controlling the activation of at least one restraint system in a motor vehicle.

Modern motor vehicles usually include a plurality of safety functions, which are supposed to protect the occupants of the motor vehicle in the event of an accident. These include, for example, airbags and belts, which are tightened in the case of an accident. Such restraint systems are normally activated as a function of a time elapsed since the beginning of a collision. However, conventional design approaches for determining the collision time are often inaccurate. In addition, an accident, which has not taken place, may be detected. In particular, in irreversible restraint systems (that is, in the case of ones, which must be exchanged after activation and may not be reused), considerable repair costs may be generated by erroneous activation.

SUMMARY

A method is provided for monitoring an accident situation of a motor vehicle, the result of the method being intended to be used, in particular, for activating at least one safety function, and, particularly preferably, for activating a restraint system in a motor vehicle. Advantageous embodiments, further refinements and improvements of the method in accordance with the present invention are described herein.

The method described is preferably intended and established for evaluating accident situations, in particular, for activating safety functions on the basis of this evaluation, in particular, restraint systems, such as airbags or belt tensioners, if it is recognized that the motor vehicle has collided with a collision object. The restraint systems are intended and set up for protecting occupants of the motor vehicle from injuries. In addition, the method described may be used, for example, to gather data about accident situations, the data being optionally used for OBD (onboard diagnosis).

In this case, the term, accident situation, means situations in which the motor vehicle collides with a collision object. Such collisions must be detected early, in order to activate safety functions for protecting occupants and/or further road users. In order to recognize whether the motor vehicle has collided with a collision object, the motor vehicle preferably has at least one acceleration sensor. A time characteristic of an acceleration of the motor vehicle is preferably recorded by the acceleration sensor. If the motor vehicle collides with a collision object, this normally results in a deceleration of the motor vehicle.

In step a), at least two values are determined, from which the accident time parameter may be ascertained in step b).

The accident time parameter is a measure of the time elapsed since (the beginning of) the collision. However, the accident time parameter is a variable determined by measurement, and therefore, within the scope of measurement and determination inaccuracies, it may differ from the time actually elapsed. In this context, in addition to pure measuring errors, in particular, inaccuracies due to idealized assumptions and approximations are also considered.

An acceleration of the motor vehicle is preferably measured, in order to determine the values in step a). This may be accomplished, for example, using an acceleration sensor. The acceleration sensor is preferably rigidly connected to the body of the motor vehicle in such a manner, that vibrations of the body are transmitted as undamped as possible to the acceleration sensor, so that the acceleration sensor is sensitive to such vibrations. It is also preferable for a time characteristic of the acceleration to be recorded. To that end, in particular, a measured value of the acceleration may be recorded, in each instance, at temporally constant intervals.

The start of the collision is preferably selected as a temporal zero point. In this case, the accident time parameter indicates the time interval between a current (instantaneous) time and the temporal zero point. If the current time is referred to as to, then the current value of the acceleration determined in step a) is preferably $a(t_0)$ (if the current value of the acceleration is determined as one of the at least two from the three possible values indicated). This is the value of the acceleration, which is present at the time that is intended to be characterized via the accident time parameter.

If the first integral dv of acceleration $a(t)$ is selected as one of the at least two of the three possible values indicated, then first integral dv is preferably determined for an interval from the temporal zero point to current time $t_0$. This means that first integral $dv(t_0)$ is evaluated over the time interval, which has elapsed since the start of the collision:

$$dv(t_0) = \int_0^{t_0} dt' a(t'). \tag{1}$$

The integration is preferably accomplished numerically. This means that, for example, the acceleration values recorded at constant time intervals are summed up. Since the acceleration prior to the start of the collision may be assumed to be nearly zero, the first integral may also be carried out by continuously summing all of the measured (discrete) acceleration values. Prior to the start of the collision, such a summation (ideally) yields no value. In order to exclude contributions from noise and/or small accelerations actually present, the summation may be limited to acceleration values, which are above a stipulated minimum value. The value determined for the first integral of the acceleration may also be reset regularly to zero, if, for example, a minimum acceleration is not present over a stipulated time span.

If the second integral ds of acceleration $a(t)$ is selected as one of the at least two of the three possible values indicated, then second integral ds is preferably evaluated for an interval from the temporal zero point to current time to:

$$ds(t_0) = \int_0^{t_0} dt' dv(t'). \tag{2}$$

The second integral of the acceleration may also be reset regularly to zero, if, for example, a minimum acceleration is not present over a stipulated time span.

The determination of the accident time parameter in step b) preferably includes the calculation of a quotient of the first integral of the measured acceleration and the second integral of the measured acceleration.

In determining the accident time parameter in step b), a constant factor (k) is preferably taken into account, this factor being greater than 2. This factor (k) is preferably greater than 2.5 and, particularly preferably, greater than 2.8. In addition, constant factor (k) is preferably less than 3.3.

In step b), the accident time parameter is preferably calculated according to an equation, from first integral dv, second integral ds and constant factor (k). The equation may include (further) calculation steps, as needed. The derivation explained in the following gives ideas of equations for ascertaining accident time parameters within the scope of step b) of the method described here.

Acceleration a of the motor vehicle is preferably modeled as a sinusoidal oscillation:

$$a(t) = A \sin(\omega t); \quad (3)$$

the duration of the entire collision event $t_{max}$ being able to be assumed to be a quarter of a period of oscillation T:

$$t_{max} = \frac{T}{4} = \frac{\pi}{2 \cdot \omega}. \quad (3a)$$

In this context, A is an amplitude of the oscillation, $\omega$ is an angular velocity of the oscillation, and t is a time parameter. Variables A and $\omega$ characterize the oscillation and may be a function of, in particular, the construction of the motor vehicle and/or of the course of the collision. This means, in particular, that variables A and $\omega$ are normally unknown. Accordingly, the described method may preferably be implemented without knowledge of variables A and $\omega$. Acceleration a(t) is (with the exception of noise) regularly zero, provided that no collision of the motor vehicle with an object has taken place.

By inserting equation (3) into equations (1) and (2), performing the integrations and using a series expansion of the trigonometric functions up to the third order (with sine terms) and/or up to the fourth order (with cosine terms), and using identities, the following expressions may be obtained for the accident time parameter, which, in this case, corresponds to current time t in an idealized manner and is therefore indicated by $t_0$ as well:

$$t_0 = \frac{3 ds(t_0)}{dv(t_0)} \quad (4)$$

$$t_0 = \frac{2 dv(t_0)}{a(t_0)} \quad (5)$$

$$t_0 = \sqrt{\frac{6 ds(t_0)}{a(t_0)}} \quad (6)$$

Equations (4), (5) and (6) are exemplary equations, with the aid of which an accident time parameter may be calculated. According to equation (4), constant factor k would be "3." Equation (6) also gives an example of an equation having further calculation steps, which may be used for determining the accident time parameter, in this case, namely, the taking of a root. Mathematically and/or physically equivalent transformations of equations (4), (5) and (6) are also possible.

In particular, an approximation with the aid of series expansion is possible, since according to equation (3a), only one quarter of a period of an oscillation is considered. In each instance, these three expressions for the accident time parameter are a function of two of the three values indicated for step a). For each combination of two of the three possible values, there is one among the equations (4) through (6), by which the accident time parameter may be obtained.

In step b), in particular, using one of equations (4) through (6), the accident time parameter may be determined from variables, which are available by measuring the acceleration. The (normally unknown) variables A and $\omega$ from the acceleration a assumed in accordance with equation (3) are not needed for determining the accident time parameter according to equations (4) through (6).

Equations (4) through (6) are three examples of how the accident time parameter may be determined in step b). One of the three equations is preferably used. However, it is also possible to use two or three of equations (4) through (6). In this case, a comparison of the values obtained may render a plausibility check possible.

In step c), it is preferably decided, using the accident time parameter determined in step b), whether a collision has taken place. If the accident time parameter is greater than the stipulated limiting value, then it is preferably assumed that a collision has taken place. In this case, preferably, it is further assumed that the collision began prior to a time $t_0$ (and therefore, at the temporal zero point used here). The temporal zero point is the one calculated time in the past. It is assumed that the collision, that is, the first contact between the collision object and the motor vehicle, has occurred at this temporal zero point. This (calculated) temporal zero point does not have to coincide exactly with the actual accident time (the time of the first contact with the collision object).

In step d), an activation signal for a safety function, in particular, for a restraint system, may optionally be outputted. In step c), as long as it is not decided that a collision has taken place, step d) is preferably not executed. Alternatively, with the same result, step d) may also be understood to mean that the execution of step d) is the non-activation of the at least one restraint system, if no collision is detected in step c).

In step c), if it is decided that a collision has taken place, then, in step d), the at least one safety system or restraint system is preferably activated as a function of the accident time parameter. The at least one restraint system may be, for example, a belt tensioner or an airbag. In particular, the described method is preferably used in a motor vehicle having a plurality of restraint systems. In this context, each of the restraint systems is preferably activated, in each instance, at a stipulated time after the start of the collision. To that end, an activation algorithm (that is, a sequence of activation instances) is preferably run through. As soon as the accident time parameter has exceeded a specific (predefined or dynamic) threshold value, a corresponding (stipulated) computational step is carried out by the activation algorithm. Preferably, a plurality of threshold values may be set, which are each assigned one action (1st to the nth threshold values). If the accident time parameter exceeds the nth threshold value, then the nth action of the activation algorithm is preferably carried out. In particular, the launching of the activation algorithm, as such, is also considered to be such an action.

In one preferred specific embodiment of the method, the accident time parameter is set to a specified value, if a mathematical calculation is not possible.

The determination of the accident time parameter according to equations (4) through (6) is only possible if $dv(t_0) \neq 0$ and/or $a(t_0) \neq 0$, since otherwise, division by zero must be carried out. In addition, equation (6) requires that $ds(t_0)/a(t_0) \geq 0$, since a root may only be taken from a positive number. If a calculation of the accident time parameter is not possible for only one or two of the three equations (4) through (6), then the accident time parameter is preferably calculated, using the remaining equation(s). If it is not possible to calculate the accident time parameter, using any of equations (4) through (6), then, according to this specific embodiment, the accident time parameter is preferably set to a fixed value (and, in particular, not calculated according to equations (4) through (6)). In this context, the accident time parameter is preferably set to a value, which is less than the limiting value used in step c). In this context, it is particularly preferable for the accident time parameter to be set to the value of zero. Consequently, in step c), it is at least not decided that a collision has taken place, as long as the accident time parameter cannot be calculated according to equations (4) through (6). This may be the case, in particular, when the measured acceleration is so small, that the current value of acceleration a(to) and/or the first integral of the acceleration dv(to) are equal to zero. In particular, that is the case, if no collision has taken place, which means that the decision in step c) should also be correspondingly negative.

In one further preferred specific embodiment of the method, the measured acceleration is filtered by a low-pass filter prior to the determination of the at least two values in step b).

In this specific embodiment, high frequencies are preferably filtered out of the time characteristic of acceleration a(t) measured in step a), using the low-pass filter. This means that only a low-frequency component of the acceleration is used. The low-pass filter is preferably set up in such a manner, that such frequencies, which may occur in the body of a motor vehicle during a collision, are used exclusively or at least preferably.

The low-pass filter preferably takes the form of an electronic component, by which the measuring signal actually recorded is filtered (before, for example, it is digitized and processed further). However, it is also possible for measured values to be recorded, digitized, and subsequently filtered by software.

The electronic measuring signal of the acceleration may include, in particular, the frequencies of the mechanical vibration. However, the measuring signal of the acceleration may also include components, which are generated due to measurement errors and/or effects in the measuring electronics. Such components of an electronic signal regularly include frequencies that are higher than mechanical vibrations. In particular, such components of the measuring signal, which do not come from the mechanical vibration and consequently constitute measurement errors, may therefore be reduced by low-pass filtering.

In particular, high-frequency components of an acceleration signal may also be generated from the transmission of a vibration inside of the body of the motor vehicle. Such high-frequency components may affect the determination of the accident time parameter detrimentally, because these only correspond to the acceleration of individual parts of the motor vehicle. On the other hand, it is preferable, in particular, for the acceleration of the center of mass of the motor vehicle to be considered in the determination of the accident time parameter. In particular, Newtonian laws are directly applicable in an especially simple form to the acceleration of the center of mass of the motor vehicle, which means that calculations may be simplified considerably, using the acceleration of the center of mass of the motor vehicle.

For this reason, in particular, a further specific embodiment of the method is preferred, in which prior to the determination of the accident time parameter in step b), the measured acceleration is transformed in such a manner, that it corresponds to an acceleration $a_{CM}$ of the center of mass of the entire motor vehicle. Interfering components from the measured, original acceleration signal(s) may be removed by such a transformation. Components, which are caused by characteristics of the motor vehicle and not by a collision, are especially considered to be interfering components.

In the case of a collision, it may be assumed, in particular, that vibrations of the body contribute to the measured acceleration. However, in addition, an acceleration of the entire motor vehicle may also be present. In particular, an acceleration of the center of mass of the motor vehicle is meant by this.

In order to improve the accuracy of the method, such accelerations of the center of mass may be used for the evaluation. To that end, the measured acceleration is preferably transformed into acceleration $a_{CM}$ of the center of mass, which may be used in the determination of the accident time parameter. This means that the acceleration of a body component relative to the center of mass of the motor vehicle is removed from the measured acceleration. In this case, the acceleration of the center of mass of the motor vehicle remains.

In a further preferred specific embodiment, acceleration signals from more than one acceleration sensor situated in the motor vehicle are used. To that end, an average acceleration signal may be calculated, in particular, from the plurality of measured (and, if indicated, respectively transformed) acceleration signals. Based on this average acceleration signal, an accident time parameter may be calculated according to the described method. In each instance, an accident time parameter may also be calculated from each individual of the plurality of measured (and, if indicated, respectively transformed) acceleration signals. An average accident time parameter may be calculated from the plurality of accident time parameters determined in this manner, by averaging them.

In a further preferred specific embodiment of the method, the first integral of the acceleration determined in step a) and/or the second integral of the acceleration determined in step a) is/are determined for a time interval of a specified interval duration, step c) being carried out at least as a function of a difference of the accident time parameter from the interval duration.

If the acceleration actually present matches the idealized assumption from equation (3), then the accident time parameter preferably matches the time actually elapsed. In this specific embodiment, this is valid insofar as, in a determination of the accident time parameter by integration over a time interval, the accident time parameter determined in this manner preferably matches the (actual) interval duration. A difference of the actual from the idealized acceleration may be deduced from the difference between the actual interval duration and the accident time parameter determined according to this specific embodiment. Consequently, the type and severity of the collision may especially be estimated. It is preferable for the activation algorithm to be reset, if the difference between the accident time parameter and the (actual) interval duration falls below or exceeds a stipulated threshold.

In this specific embodiment, the values determined for the first and/or for the second integral are preferably reset to zero again (automatically), if no acceleration is measured for some time. In this manner, noise in the measurement of the acceleration may not result in erroneous detection of a collision (actually not present).

It is preferable for the determination of the first and/or of the second integral of the acceleration to take place subdivided into intervals, in such a manner, that after the end of one interval, the next interval immediately begins. In this manner, it may be ensured that a collision may be detected at all times.

In one further preferred specific embodiment of the method, an accident time comparison parameter is determined, step c) being carried out at least as a function of a difference of the accident time parameter from the accident time comparison parameter.

Equations (4) through (6) were obtained with the assumption that due to a collision, a vibration having an acceleration according to equation (3) is generated. The acceleration actually occurring may deviate from this assumption. In this context, in particular, an impact speed, an impact angle, a collision zone (that is, the region, at which the motor vehicle strikes the collision object), structural details of the motor vehicle and/or a mass, a shape, and/or a density of the collision object may have an influence on this deviation. Inferences about the above-mentioned factors may be drawn from the degree of the deviation. In particular, the actual acceleration may differ variably sharply from the idealized assumption as a function of the severity of the collision. Consequently, the accident time parameter determined on the basis of the idealized assumption may also differ from the time actually elapsed since the beginning of the collision.

For example, the accident time comparison parameter may be defined as a time elapsed since a minimum acceleration has been exceeded. The accident time comparison parameter may also be determined, for example, using a regression of the first and/or second integral of the acceleration.

It is preferable for the accident time parameter to only be assumed to be plausible, if the magnitude of the difference between the accident time parameter and the accident time comparison parameter is less than a stipulated plausibility value. If the same time for the start of the collision (within the scope of the plausibility value) is ascertained using two different methods, then it matches the actual start of the collision with greater probability than in the case of a determination using only one method. In this specific embodiment, in particular, a restraint system may be prevented from being activated mistakenly. To that end, in step d), it is preferable for the at least one restraint system to only be activated, if the accident time parameter is assumed to be plausible by comparison to the accident time comparison parameter.

In one further preferred specific embodiment of the method, step c) is carried out at least as a function of an absolute difference of the accident time parameter from a time actually elapsed since a temporal zero point.

In this specific embodiment, the plausibility of the accident time parameter may be checked, in particular, in comparison with a time actually elapsed. The temporal zero point may be, for example, the (actual) time of the start of the collision or the time of the first contact of the motor vehicle with the collision object. Since this temporal zero point is normally unknown and should be ascertained, in particular, by determining the accident time parameter, an assumed time of the start of the collision is preferably used as a temporal zero point. As an option, the time of detecting a collision (according to step c) may also be set as the temporal zero point. It is also possible to use, as a temporal zero point, a time, which is a (stipulated or calculated) starting value prior to the time of detecting a collision (according to step c). According to this, the starting value is a(n) (assumed) time span between an actual collision and the time of detecting this collision. If the accident time parameter exceeds a stipulated starting value, then a time counter is preferably started, by which the time elapsed as of the time of exceeding the starting value is monitored, in order to determine regularly the difference of the elapsed time from the accident time parameter. In the case of an ideal sinusoidal vibration according to equation (3), the time counter and the accident time parameter are only shifted by the starting value, but increase equally with the time. If the value of the time counter differs from the value of the accident time counter minus the starting value, then it may be assumed that a non-ideal sinusoidal vibration is present. The type and severity of the collision may be inferred from the magnitude and algebraic sign of the deviation. The activation of the at least one restraint system in step c) preferably takes place as a function of, in particular, the difference of the value of the time counter from the value of the accident time counter minus the starting value. In this context, the activation time for the at least one restraint system may be adjusted, for example, as a function of the magnitude and/or algebraic sign of the difference.

In some instances, inferences about the type and severity of the collision are also possible from the (absolute) difference.

It is preferable for a change in the activation algorithm to be carried out, as soon as the difference between the time counter and the value of the accident time counter minus the starting value exceeds or falls below a stipulated limit at a time and/or over a particular time interval. The change in the activation algorithm may be, for example, in a modification of a sensitivity of an activation threshold for the at least one restraint system or the immediate (moved-up) activation of the at least one restraint system. If, for example, a particularly severe collision is detected, then a restraint system may be activated especially rapidly.

The time counter is preferably designed to output (discrete) time values at constant time intervals. This may be implemented, for example, by software. For example, the time counter may output values t'=1; 2; 3; 4; ... (in arbitrary units). At the corresponding times, the accident time parameter may be, for example, to =1.1; 1.9; 3.1; 4.2; .... At (actual) time t'=4, the absolute difference between the two variables is, in this case, 0.2.

In one further preferred specific embodiment of the method, step c) is carried out at least as a function of a current difference of the accident time parameter from a time actually elapsed.

In this specific embodiment, in particular, it is preferable for the time counter to be designed to output (discrete) time values at constant time intervals. In this context, the current difference between the time counter and the accident time parameter is the change in the difference between the two variables from one of the discrete times to the next. The current difference may also be referred to as jitter. In the example described for the previous specific embodiment, the current difference at the four times is +0.1; −0.2; +0.2; +0.1. Information about the course of the collision may be obtained through the current difference. The activation algorithm is preferably adjusted, in particular, in view of this current difference. For example, if, in the course of a collision, it is recognized that the severity was estimated incorrectly, then the estimation may be corrected.

A control module is put forward as a further aspect of the present invention, the control module including at least one input terminal, via which the control module receives a signal of at least one acceleration sensor, and including at least one output terminal, via which the control module may emit a signal for activating a safety function and, in particular, for activating a restraint system, the control module being set up to execute the method described herein.

The control module preferably includes at least one airbag control unit. In addition, the control module preferably includes at least a piece of software, which is configured to execute the method described.

The particular advantages and design features of the method described further above are applicable and transferable to the control module described.

A computer program for executing the described method, as well as a machine-readable storage program, on which this computer program is stored, are also be described herein.

The present invention and the technical field are explained below in greater detail, in light of the figures. The figures show particularly preferred exemplary embodiment, to which the present invention is, however, not limited. In particular, it should be pointed out that the figures and, especially, the dimensional ratios shown are only schematic.

DETAILED DESCRIPTION OF EXAMPLE EMBODIMENTS

Figure 1:
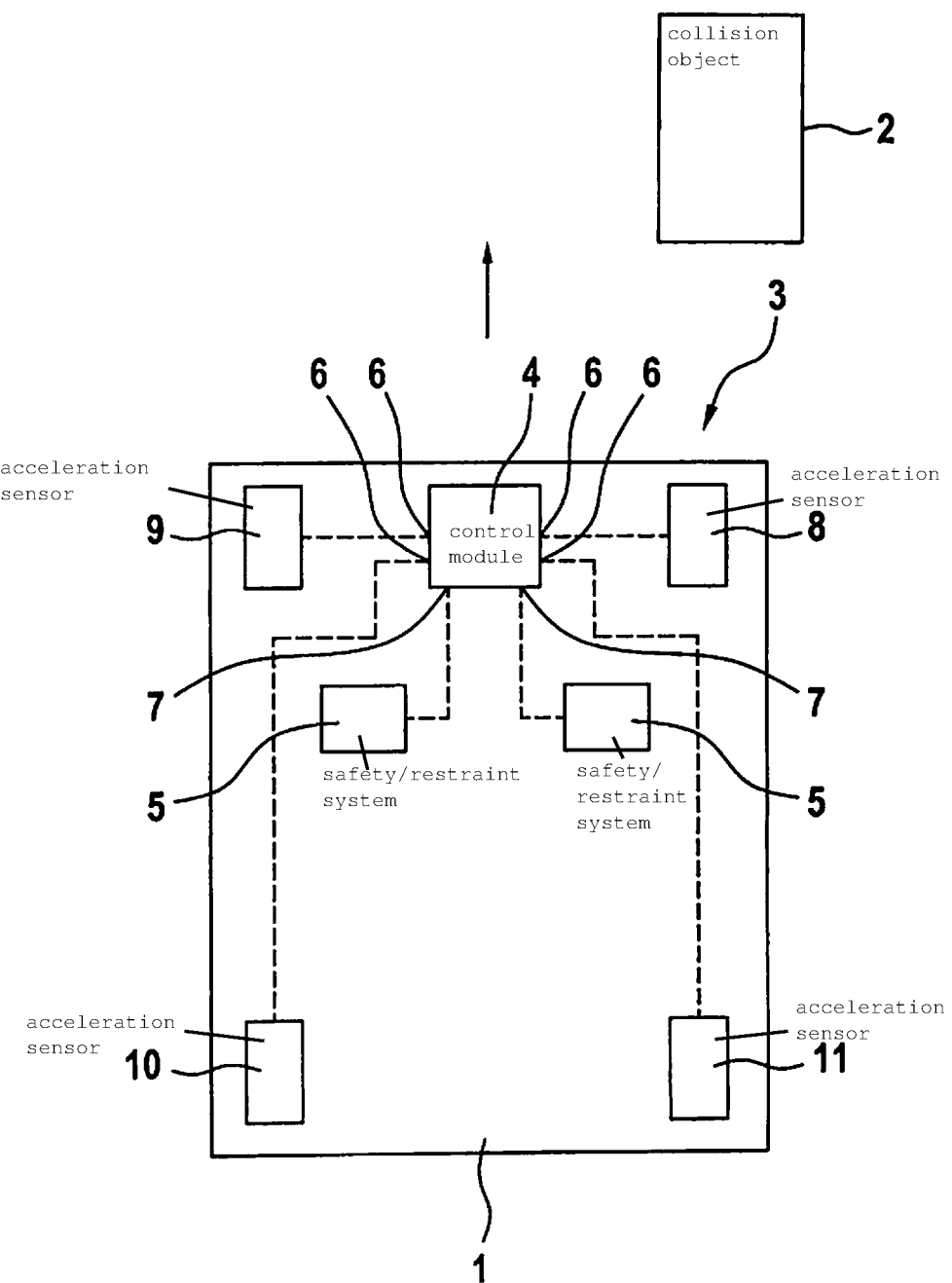
FIG. 1 shows a motor vehicle and a collision object.

FIG. 1 shows a motor vehicle 1, which is moving towards a collision object 2, as indicated by the arrow. In particular, a collision zone 3 of motor vehicle 1 is affected by the imminent collision. This means that motor vehicle 1 strikes collision object 2 at collision zone 3. Consequently, motor vehicle 1 is especially damaged in collision zone 3. The motor vehicle includes a first acceleration sensor 8, a second acceleration sensor 9, a third acceleration sensor 10, and a fourth acceleration sensor 11. If an acceleration is detected by one or more of acceleration sensors 8, 9, 10, 11, then this may indicate a collision. To protect the occupants, motor vehicle 1 includes a plurality of safety systems (in particular, restraint systems 5), of which two are shown, here, by way of example.

Motor vehicle 1 includes a control module 4, in order to activate the safety systems or restraint systems 5 in response to a collision. Control module 4 is configured to receive signals from acceleration sensors 8, 9, 10, 11 via four input terminals 6, and to emit signals for activating restraint systems 5 via two output terminals 7.

Control module 4 is configured to implement the following method: An acceleration is initially measured by each of acceleration sensors 8, 9, 10, 11. The measured values may be filtered by a low-pass filter (which, for example, may be integrated in control module 4). In each instance, an accident time parameter may be determined by each of acceleration sensors 8, 9, 10, 11 in accordance with the method described herein. Using averaging, a mean accident time parameter, which exhibits a particularly high accuracy, may be obtained from the accident time parameters respectively obtained. Starting out from the accident time parameter obtained in this manner, it may be decided whether a collision of motor vehicle 1 with collision object 2 has taken place. The decision is made by comparing the accident time parameter to a limiting value. If such a collision is detected, then restraint systems 5 are activated.

Figure 2:
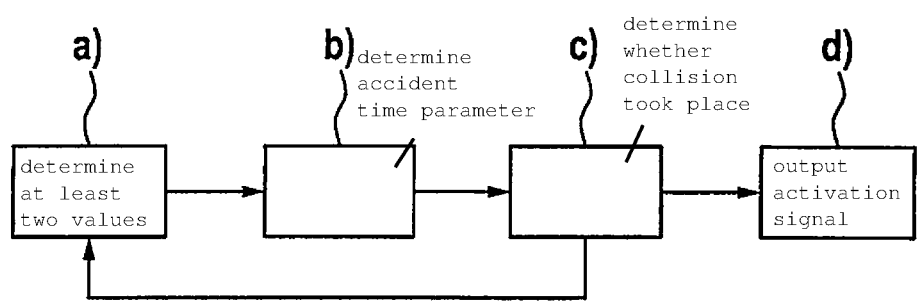
FIG. 2 shows a flow chart of the example method according to the present invention.

FIG. 2 shows a flow chart of the method described herein. The boxes depicted represent method steps a) through d). During operation of the motor vehicle, method steps a) and c) are preferably executed continually or, if indicated, executed repeatedly at regular intervals, in the form of a loop. If the accident time parameter exceeds a limiting value, then method step d) is executed.

What is claimed is:

1. A method of activating a safety function of motor vehicle in an accident situation of the motor vehicle, the method comprising the following steps:
   measuring, using an acceleration sensor of the motor vehicle, an acceleration of the motor vehicle;
   a) determining at least two of the following values:
      i) a current value of the measured acceleration,
      ii) a first integral of the measured acceleration, or
      iii) a second integral of the measured acceleration, the second integral being an integral of the first integral;
   b) determining an accident time parameter for evaluating an accident situation of a motor vehicle, the accident time parameter being determined from the at least two values determined in step a) by determining at least one of: (i) a quotient of the determined second integral and the determined first integral, and/or (ii) a quotient of the first integral and the determined current value of the measured acceleration, and/or (iii) a quotient of the second integral and the current value of the measured acceleration;
   c) subsequent to step b) activating a restraint system of the motor vehicle as a function of the determined accident time parameter.

2. The method as recited in claim 1, wherein the measured acceleration is filtered by a low-pass filter prior to the determination of the accident time parameter in step b).

3. The method as recited in claim 1, wherein prior to the determination of the accident time parameter in step b), the measured acceleration is transformed in such a manner, that it corresponds to an acceleration of a center of mass of the entire motor vehicle.

4. The method as recited in claim 1, wherein in determining the accident time parameter in step b), a constant factor is taken into account, the factor being greater than 2.

5. The method as recited in claim 1, wherein the restraint system includes an airbag and/or a belt tensioner.

6. The method as recited in claim 1, wherein the determining of the accident time parameter includes determining the quotient of the determined second integral and the determined first integral.

7. The method as recited in claim 1, wherein the determining of the accident time parameter includes determining the quotient of the first integral and the determined current value of the measured acceleration.

8. The method as recited in claim 1, wherein the determining of the accident time parameter includes determining the quotient of the second integral and the current value of the measured acceleration.

9. The method as recited in claim 1, further comprising the following step:
   comparing the determined accident time parameter to a predetermined limiting value;
   wherein the restraint system is activated based on a result of the comparing step.

10. A method for activating a safety function of a motor vehicle in an accident situation, the method comprising the following steps:
    measuring, using an acceleration sensor of the motor vehicle, an acceleration of the motor vehicle;

determining an accident time parameter for evaluating an accident situation of a motor vehicle, including:
  a) determining at least two of the following values: i) a current value of the measured acceleration, ii) a first integral of the measured acceleration, or iii) a second integral of the measured acceleration, the second integral being an integral of the first integral, and
  b) determining the accident time parameter from the at least two values determined in step a) by determining at least one of: (i) a quotient of the determined second integral and the determined first integral, and/or (ii) a quotient of the first integral and the determined current value of the measured acceleration, and/or (iii) a quotient of the second integral and the current value of the measured acceleration; and subsequent to step b), performing:
  c) deciding a collision of the motor vehicle with a collision object has taken place, the decision being made by comparing the accident time parameter determined in step b) to a limiting value, and
  d) based on deciding the collision has taken place, outputting an activation signal to activate the at least one safety function of the motor vehicle.

11. The method as recited in claim 10, wherein at least one of: the first integral of the acceleration determined in step a) and the second integral of the acceleration determined in step a) is determined for a time interval of a specified interval duration, and step c) is carried out at least as a function of a difference of the accident time parameter from the interval duration.

12. The method as recited in claim 10, wherein an accident time comparison parameter is determined, and step c) is carried out at least as a function of a difference of the accident time parameter from the accident time comparison parameter.

13. The method as recited in claim 10, wherein step c) is carried out at least as a function of an absolute difference of the accident time parameter from a time actually elapsed since a temporal zero point.

14. The method as recited in claim 10, wherein step c) is carried out at least as a function of a current difference of the accident time parameter from a time actually elapsed.

15. The method as recited in claim 10, wherein the safety function includes an airbag and/or a belt tensioner.

16. A control unit, comprising at least one input terminal via which the control unit may receive a signal of at least one acceleration sensor of a motor vehicle, and at least one output terminal via which the control unit may emit a signal for activating a restraint system of the motor vehicle, the control unit configured to:
  measure, using the acceleration sensor of the motor vehicle, an acceleration of the motor vehicle;
  determine an accident time parameter for evaluating an accident situation of a motor vehicle, including:
    a) determining at least two of the following values: i) a current value of the measured acceleration, ii) a first integral of the measured acceleration, or iii) a second integral of the measured acceleration, the second integral being an integral of the first integral, and
    b) determining the accident time parameter from the at least two values determined in step a) by determining at least one of: (i) a quotient of the determined second integral and the determined first integral, and/or (ii) a quotient of the first integral and the determined current value of the measured acceleration, and/or (iii) a quotient of the second integral and the current value of the measured acceleration; and
  subsequent to b):
    c) determine whether a collision of the motor vehicle with a collision object has taken place, the decision being made by comparing the accident time parameter determined in b) to a limiting value, and
    d) output an activation signal to activate the restraint system of the motor vehicle, if the collision has been determined in step c).

17. A non-transitory machine-readable storage medium on which is stored a computer program for activating a safety function of motor vehicle in an accident situation of the motor vehicle, the computer program, when executed by computer, causing the computer to perform the following steps:
  measuring, using an acceleration sensor of the motor vehicle, an acceleration of the motor vehicle;
  a) determining at least two of the following values:
    i) a current value of the measured acceleration,
    ii) a first integral of the measured acceleration, or
    iii) a second integral of the measured acceleration, the second integral being an integral of the first integral;
  b) determining an accident time parameter for evaluating an accident situation of a motor vehicle, the accident time parameter being determined from the at least two values determined in step a) by determining at least one of: (i) a quotient of the determined second integral and the determined first integral, and/or (ii) a quotient of the first integral and the determined current value of the measured acceleration, and/or (iii) a quotient of the second integral and the current value of the measured acceleration;
  c) subsequent to step b) activating a restraint system of the motor vehicle as a function of the determined accident time parameter.

18. The non-transitory machine-readable storage medium as recited in claim 17, wherein the computer program, when executed by the computer, further causes the computer to perform the following step:
  comparing the determined accident time parameter to a predetermined limiting value;
  wherein the restraint system is activated based on a result of the comparing step.

* * * * *